(12) United States Patent
Cocchini et al.

(10) Patent No.: US 8,733,131 B2
(45) Date of Patent: May 27, 2014

(54) APPARATUS AND METHOD FOR CHEMICAL DEPOSITION ON A ROD MEMBER IN AN OPTICAL FIBRE MANUFACTURING PROCESS

(75) Inventors: Franco Cocchini, Salerno (IT); Antonio Schiaffo, Salerno (IT); Alessandro Rossi, Baronissi (IT)

(73) Assignee: Prysmian Cavi e Sistemi Energia S.R.L., Milan (IT)

(*) Notice: Subject to any disclaimer, the term of this patent is extended or adjusted under 35 U.S.C. 154(b) by 855 days.

(21) Appl. No.: 10/496,866

(22) PCT Filed: Nov. 29, 2001

(86) PCT No.: PCT/EP01/13929

§ 371 (c)(1),
(2), (4) Date: Nov. 30, 2004

(87) PCT Pub. No.: WO03/045861

PCT Pub. Date: Jun. 5, 2003

(65) Prior Publication Data

US 2005/0072193 A1 Apr. 7, 2005

(51) Int. Cl.
*C03B 37/027* (2006.01)

(52) U.S. Cl.
USPC .......................................................... 65/421

(58) Field of Classification Search
USPC .......................................................... 65/421
See application file for complete search history.

(56) References Cited

U.S. PATENT DOCUMENTS

| | | | |
|---|---|---|---|
| 3,305,289 A * | 2/1967 | Fridrich ......................... | 445/14 |
| 4,810,276 A | 3/1989 | Gilliland | |
| 5,030,266 A * | 7/1991 | Baltzer et al. .................. | 65/508 |
| 5,183,490 A * | 2/1993 | Mikami et al. .................. | 65/144 |
| 5,191,633 A * | 3/1993 | von Bagh ....................... | 385/147 |
| 5,658,365 A | 8/1997 | Chludzinski et al. | |
| 5,958,102 A | 9/1999 | Shimada et al. | |
| 6,196,028 B1 * | 3/2001 | Humbert et al. ................ | 65/483 |

FOREIGN PATENT DOCUMENTS

| | | | |
|---|---|---|---|
| EP | 0 367 871 A1 | 5/1990 | |
| EP | 0 482 348 A2 | 4/1992 | |
| EP | 0 630 866 A1 | 12/1994 | |
| EP | 1 106 584 A2 | 6/2001 | |
| JP | 9-156946 | 6/1997 | |
| WO | WO 99/09437 | * | 2/1999 |
| WO | WO 01/23311 A1 | 4/2001 | |
| WO | WO 01/49616 A1 | 7/2001 | |

OTHER PUBLICATIONS

Weisbach, Mechanics of Engineering and of Machinery, vol. III. Part 1., Section 1: The Mechanics of the Machinery of Transmission, 1883, John Wiley & Sons, pp. 70-90.*

Komura Yukio; "Apparatus for Producing Optical Fiber Soot"; Patent Abstracts of Japan, of JP 06-329432 A, Nov. 29, 1994.

* cited by examiner

*Primary Examiner* — John Hoffmann
(74) *Attorney, Agent, or Firm* — Finnegan, Henderson, Farabow, Garrett & Dunner, L.L.P.

(57) ABSTRACT

An apparatus and method for chemical deposition on a rod member having a support structure for supporting the rod member substantially coaxial to a deposition axis; a burner for depositing chemical substances on the rod member; and a rotation device for imparting a rotation motion to the rod member. The rotation device has a joint member of a type suitable to transmit torque between two misaligned members, for example, a double universal joint or a flexible joint, positioned between a motor and a rod gripping member.

9 Claims, 5 Drawing Sheets

APPARATUS AND METHOD FOR CHEMICAL DEPOSITION ON A ROD MEMBER IN AN OPTICAL FIBRE MANUFACTURING PROCESS

CROSS REFERENCE TO RELATED APPLICATIONS

This application is a national phase application based on PCT/EP01/13929, filed Nov. 29, 2001, the content of which is incorporated herein by reference.

BACKGROUND OF THE INVENTION

1. Field of the Invention

This invention relates to an apparatus and a method for the chemical deposition of synthetic material on a rod member, in a process for the manufacturing of an optical fibre.

2. Description of the Related Art

As is well known, a process for manufacturing an optical fibre comprises first producing a preform of vitreous material by a chemical deposition process, and then drawing the optical fibre from the preform after having positioned the perform vertically within a furnace, so as to cause the fusion of a lower part thereof.

Patent EP 367871 in the name of Corning Glass Works describes a method for obtaining an optical fibre. This method initially comprises the step of depositing particles of glass comprising base glass and a refractive-index-increasing dopant onto a mandrel. The mandrel is then removed and the resulting soot preform is consolidated so as to form a core preform. The core preform is stretched and the hole in it is closed to form a core rod, or cane. Cladding glass soot is then deposited on the core rod to obtain a final preform, which is then consolidated and drawn so as to obtain an optical fibre.

A process of the type just described is commonly known as an OVD (Outside Vapour Deposition) process. According to patent EP 367871, stretching of the core preform may be performed by means of a traction device comprising a pair of traction driving wheels, which apply a downward traction force to the opposite sides of the core rod being formed.

When the latter step is performed, it is possible that, as a result of an inaccurate positioning of the core rod, of an inhomogeneous thermal profile within the furnace or of the action of the traction wheels, opposite sides of the core rod are subjected to different forces which cause bending of the core rod during its formation; for this reason, core rods that are not perfectly straight can be produced. This shape defect of the core rod will be referred to as an "intrinsic shape defect", to distinguish it from other types of shape defects caused by subsequent process steps.

To mitigate the problem of intrinsic shape defects, international patent application WO01/49616 in the name of Pirelli Cavi e Sistemi S.p.A. proposes to impart a twist to the core rod during stretching from the core preform, so as to produce a core rod with a high degree of straightness.

Again in accordance with patent EP 367871, before the cladding glass soot is deposited on the core rod, the core rod is attached at one end to a gripping device mounted on a lathe, so that a rotation motion can be applied to the core rod about a predetermined rotation axis (which will also called "deposition axis"). The Applicant has noted that, when this step is carried out, positioning errors of the core rod on the gripping device can occur, with the result that the axis of the core rod does not coincide with the intended deposition axis. Therefore, when a torque is applied to the core rod to produce rotation thereof about the deposition axis, the rod will not rotate coaxial to deposition axis but on a conic trajectory about the deposition axis.

U.S. Pat. No. 5,958,102 in the name of Shin-Etsu Chemical Co, describes a deposition process wherein one end of the core rod is held by a gripping device and the opposite end is rotatively held by rollers. According to the Applicant, although holding both ends of the rod may force the rod to lie substantially along the deposition axis, a positioning error of the rod on the gripping device may in this case cause bowing of the rod with respect to the deposition axis. Therefore, a misalignment would still exist between the rod axis and the deposition axis.

The Applicant has also noted that another cause of displacement of the deposition rod from the intended deposition axis is represented by possible misalignments among the different components of the device that applies rotation to the deposition rod. This device typically comprises, in addition to a gripper (also referred to as a gripping member or gripping device as previously described), a motor for generating the rotation torque. A defective connection between motor and gripping member can lead to a misalignment thereof, which again can result in an erroneous orientation or in a bending of the deposition rod.

An additional cause of shape defect can be the change in stress in the rod that result from heating the rod during the deposition process, as described in EP 630866.

As a result of the abovementioned straightness and/or orientation errors of the deposition rod, the rod may wobble when rotated during the deposition process, thus determining an uneven deposition of soot and a non-symmetrical final perform. Therefore, the final preform may have a central portion (defined by the core rod) that is not perfectly centred, and the resulting optical fibre will have a core that is not concentric with the cladding.

The core/clad concentricity, defined as the distance between the axis of the core and the axis of the cladding, is a fundamental parameter for an optical fibre. Typically the concentricity should have a small value (e.g. less than 0.5 μm, preferably less than 0.3 μm) so that, when two end portions of two different optical fibres are coupled together, the attenuation in the transmitted light is small. Optical fibres are in fact typically connected by aligning the outer surfaces of the corresponding claddings and therefore, if the cores are not perfectly located along the axes of the corresponding fibres, coupling between the two cores may be partial, giving rise to a coupling with high losses.

Different techniques are known for improving the core/cladding concentricity in optical fibres.

U.S. Pat. No. 5,658,365, in the name of Corning, proposes to apply a longitudinal tension to the deposition rod while holding it during the deposition process. The tensile force, which serves to reduce the wobbling problem, may be applied at one or both ends of the rod. The Applicant observes that the apparatus required for applying such a longitudinal tension during the deposition process is rather complex and expensive.

International patent application WO01/23311, in the name of FIBRE OTTICHE SUD—F.O.S., proposes to grip one end of the deposition rod for imparting rotation thereof, and applying two spaced radial constraints to the opposite end of the rod, thus forcing the rod to lie coaxial with the axis of rotation. The Applicant observes that this technique is more effective in reducing intrinsic shape defects of the deposition rod than in solving problems arising from rod positioning errors or misalignments of the rotation device. In fact, when positioning errors or rotation device misalignments occur, the rod undergoes a stress that tends to cause bending thereof.

SUMMARY OF THE INVENTION

The Applicant has tackled the problem of preventing the deposition rod from being subjected to deforming stress and of guaranteeing a correct alignment of the deposition rod along the rotation axis during the process of chemical deposition. In particular, the Applicant has faced the problem of developing a method that is particularly effective in solving misalignment problems caused by rod positioning errors (i.e. misalignments between the axis of the deposition rod and the axis of the gripping member) or misalignments within the rotation device (in particular, between the motor axis and the axis of the gripping member).

The Applicant has found that, by supporting the rod coaxial to the rotation axis and providing the rotation device with a member capable of varying the direction of the rotation torque whenever a misalignment occurs (the torque being here intended as a vector quantity, i.e. a quantity possessing both magnitude and direction), any misalignment problem of the type previously described can be corrected and the deposition rod can therefore lie substantially coaxial to the deposition axis void of any deforming stress. In particular, the presence of such a member in the rotation device allows the rotation torque to be always directed along the axis of the deposition rod even if a misalignment problem exists, thus preventing the deposition rod from being subjected to non-axial torques, which would tend to deform it.

The Applicant has in particular found that the correction of said misalignment problems can be obtained by connecting motor and rod gripping member by a joint member suitable to redirect the torque, preferably a double joint member such as a double universal joint.

The apparatus according to the invention is therefore suitable to produce a final preform from which it is possible, through a drawing process, to obtain an optical fibre having a high degree of core/cladding concentricity.

In a first aspect thereof, this invention relates to a method for the chemical deposition on a rod member, comprising:
  supporting the rod member with its longitudinal axis substantially coaxial to a deposition axis;
  coupling one end portion of the rod member to a handling member having a handling axis;
  transmitting a torque generated about a motor axis to the rod member via the handling member, for rotating the rod member about the deposition axis; and
  depositing chemical substances on the rod member during rotation of the rod member;
wherein transmitting the torque comprises redirecting the torque whenever a misalignment occurs between the motor axis and the handling axis or between the handling axis and the longitudinal axis of the rod member.

Preferably, supporting the rod member comprises applying at least one radial constraint to a first end portion of the rod member and at least one radial constraint to a second end portion of the rod member.

Applying at least one radial constraint to the second end portion of the rod member may comprise applying two radial constraints to respective spaced portions of the second end portion and applying at least one radial constraint to the first end portion of the rod member may comprise applying two radial constraints to respective spaced portions of the first end portion.

In a second aspect thereof, the present invention relates to an apparatus for the chemical deposition on a rod member, comprising:
  a support structure for supporting the rod member substantially coaxial to a rotation axis;
  a burner for depositing chemical substances on the rod member; and
  a rotation device for transmitting a torque to the rod member so as to impart rotation to the rod member about the rotation axis;
  wherein the rotation device comprises a joint member apt to vary the direction of the transmitted torque.

The rotation device preferably comprises a motor for generating the torque and a handling member apt to couple with the rod member, and the joint member is preferably positioned between the motor and the handling member. The handling member is preferably a gripping member suitable to grip one end portion of the rod member.

The joint member may comprise a universal joint. Moreover, the joint member may comprise a double joint. Preferably, the double joint comprises a universal double joint, more preferably a double Hooke's joint. Alternatively to the universal joint, or in combination with the universal joint, the joint member may comprise a flexible joint.

Preferably, the support structure comprises a first support member suitable to apply a radial constraint to a first end portion of the rod member and a second support member suitable to apply a radial constraint to a second end portion of the rod member.

The support structure may also comprise a further support member suitable to apply a further radial constraint to the first end portion of the rod member and, alternatively or in combination, a further support member suitable to apply a further radial constraint to the second end portion of the rod member.

BRIEF DESCRIPTION OF THE DRAWINGS

Further details may be found in the following description, which refers to the appended figures listed here.

DETAILED DESCRIPTION OF THE INVENTION

Figure 1:
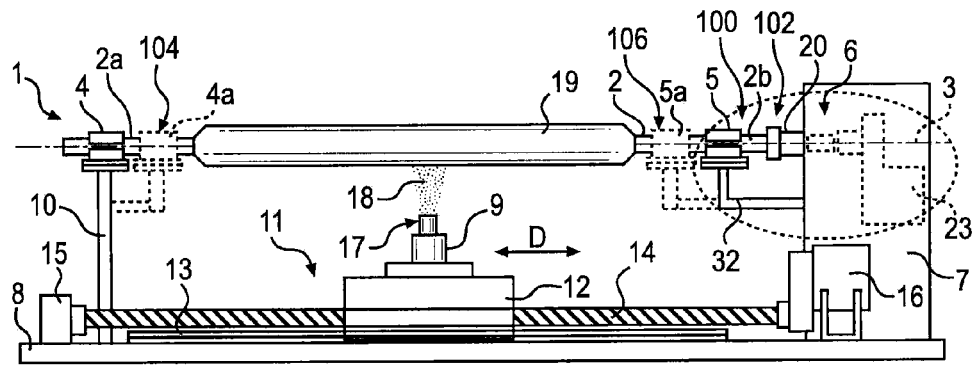
FIG. 1 illustrates an apparatus for chemical deposition onto a deposition rod in accordance with this invention, in a schematically side view.

A glass preform for optical fibre may be produced by a process as follows.

In a first stage, a plurality of chemical substances is deposited on a cylindrical mandrel (which can be held horizontally or vertically and is preferably made of alumina or other ceramic material) by means of a deposition device described hereinafter. These substances typically comprise silicium and germanium, deposited as oxides ($SiO_2$ and $GeO_2$), and they will subsequently form the core and an inner portion of the cladding of the optical fibre.

During the deposition process, the mandrel is set into rotation about its axis and the burner is reciprocated in parallel to the axis of the mandrel for a predetermined number of times and within a predetermined motion range, so as to grow a soot body of predetermined diameter and length.

During the soot deposition, the reactants flow may be varied so as to obtain a predetermined refraction index profile by a controlled deposition of the chemical substances.

The product of this first stage is a cylindrical preform of glass material, named "core preform", which will be formed into the core and an internal cladding region of the optical fibre.

In a second stage, the mandrel is extracted from the core preform, leaving a central hole therein.

In a third stage, the core preform is subjected to a process of drying and consolidation in a furnace, which comprises feeding $Cl_2$ and other gas into the central hole in order to eliminate the hydroxide ions (—OH) and the atoms of water contained in the preform. Thus a vitrified core preform is obtained, wherein the central hole has a lower diameter than in the initial core preform.

In a fourth stage, after vacuum has been created inside the central hole (as described, for example, in U.S. Pat. No. 4,810,276 in the name of Corning), the vitrified core preform is placed in a vertical furnace for melting a lower end thereof. The melt of the lower end and the vacuum inside the hole cause the walls of the hole to collapse. The fused glass material then cools, forming a cylindrical elongated member of predetermined diameter, which is stretched downwards by a traction device. Preferably, a traction device of the type described in the above mentioned patent application WO01/49616 is used, so that a twist is imparted to the elongated member during stretching, thus producing a rod-like member with a high degree of straightness (i.e. substantially void of intrinsic shape defects). After further cooling, the elongated member so produced is cut to obtain a plurality of rods, named "core rods", having a typical length of about one metre and a typical external diameter of about 10-20 mm.

In a fifth stage, each core rod is used as a substrate for a further process of chemical deposition ("overcladding") similar to the one of the first stage. This deposition process comprises depositing on the core rod a plurality of chemical substances (typically including $SiO_2$), which will subsequently form an external portion of the cladding of the optical fibre. This further deposition process can be carried out by using the same deposition device used in the first stage. The product of the fifth stage is a low-density cylindrical preform, hereinafter called "final preform".

In a sixth (and last) stage, the final preform is dried and consolidated by the same procedures as those specified for the third stage, so as to obtain a vitrified final preform, which can be subsequently drawn in a known way to obtain an optical fibre.

FIG. 1 indicates, as a whole, an apparatus 1 for the chemical deposition onto a cylindrical deposition rod 2 of vitreous material that is suitable for use in the first and fifth steps of the abovementioned process.

Apparatus 1 is adapted to hold deposition rod 2 substantially coaxial to a horizontal deposition axis 3 and to rotate it about axis 3 during the deposition process. Apparatus 1 comprises a first support member 4 suitable for rotative coupling with a first end portion 2a of deposition rod 2, a second support member 5 suitable for rotative coupling with a second end portion 2b of deposition rod 2 at a first axial position 100, and a motorized rotation device 6 suitable for rigid coupling with the second end portion 2b in the correspondence of the extremity thereof and suitable for applying, through this rigid coupling, a rotation motion to deposition rod 2 about axis 3.

Rotation device 6 and second support member 5 are held by a support structure 7 that is rigidly fixed to a horizontal base 8. In particular, rotation device 6 is partially housed inside a chamber defined by support structure 7, while second support member 5 is external to support structure 7 and fixed to it by means of a L-shaped member 32. First support member 4 is fixed to base 8 by means of a corresponding holding member 10. The distance between support members 4 and 5 can be adjusted during the step of setting up apparatus 1.

Apparatus 1 further comprises a deposition burner 9 of a known type, which is mounted on a sliding device 11 suitable to move burner 9 between support members 4 and 5 along a direction D parallel to axis 3.

Sliding device 11 comprises a slide 12 coupled to a straight guide 13 fixed to base 8 and parallel to axis 3. Slide 12 is internally provided with a longitudinal threaded seat (not shown) coupled to a screw 14 extending parallel to guide 13. Screw 14 has one end rotatively coupled to a holding member 15 fixed to base 8 and the other end coupled to the rotating shaft of an electric motor 16, so that when motor 16 is activated screw 14 is set into rotation and produces a linear movement of slide 12 along direction D. By alternating the motion of motor 16, the linear motion of burner 9 can be reversed to allow multiple passages during the deposition process.

Alternatively, burner 9 may be in a fixed position and support structure 7 and holding member 10 may be mounted on a sliding device (not shown) suitable to translate support member 7 and holding member 10 in a direction parallel to axis 3. For example, a screw mechanism similar to that in FIG. 1 can be used to move support structure 7 and holding member 10 synchronously.

Figure 2:
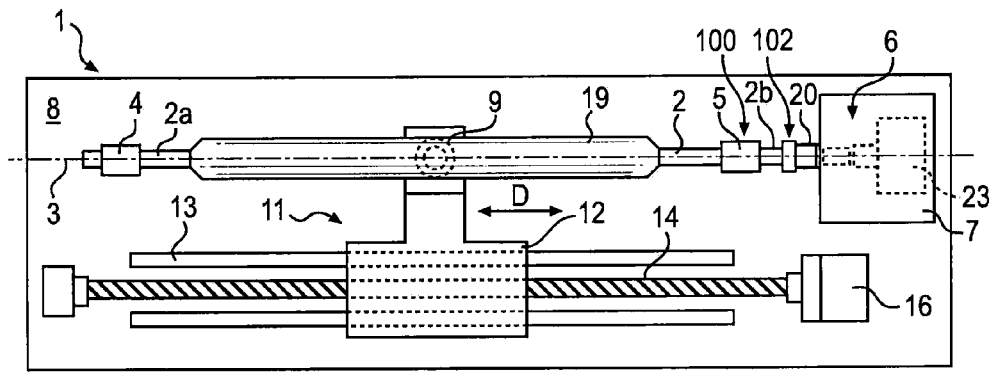
FIG. 2 is a top view of the apparatus of FIG. 1.

Burner 9 comprises a nozzle 17 (or a plurality of nozzles) extending towards deposition rod 2 and adapted to emit a flame 18 for heating deposition rod 2, together with a plurality of chemical substances to be deposited on deposition rod 2. One example of a burner suitable for the purpose is described in U.S. Pat. No. 5,203,897. By depositing these substances during its reciprocating motion, burner 9 allows formation on deposition rod 2 of a preform 19, shown at an intermediate stage of growth in FIG. 1 and FIG. 2.

First and second support members 4 and 5 are suitable to apply radial constraints to the respective end portions 2a, 2b of deposition rod 2. In this respect, first and second support members 4 and 5 may be considered as equivalent to cylindrical hinges where, for the purpose of the present invention, with "cylindrical hinge" it is intended a member suitable to couple to a cylindrical body like deposition rod 2 so as to avoid transversal translation thereof and allow free rotation and preferably also longitudinal translation thereof.

Support members 4 and 5 may be, for example, of a type comprising a V-groove having contact surfaces made of a material with a low coefficient of friction (e.g. a flourorate polymer (Rulon® J or Valflon ® F107)) or of the type described in the above mentioned patent application WO01/23311. In brief, the support members described in WO01/23311 comprise a first and a second body hinged to each other, each holding a couple of oval-shaped rotating members having the respective axes parallel to the rotation axis. Each support member has an open and a close position. In the open position, the support member allows positioning the rod onto the rotating members of the first body. In the closed position, the rotating members of the second body contact the rod oppositely with respect to the rotating members of the first body. The rotating members are free to rotate and provide a radial constraint to the rod.

Figure 3:
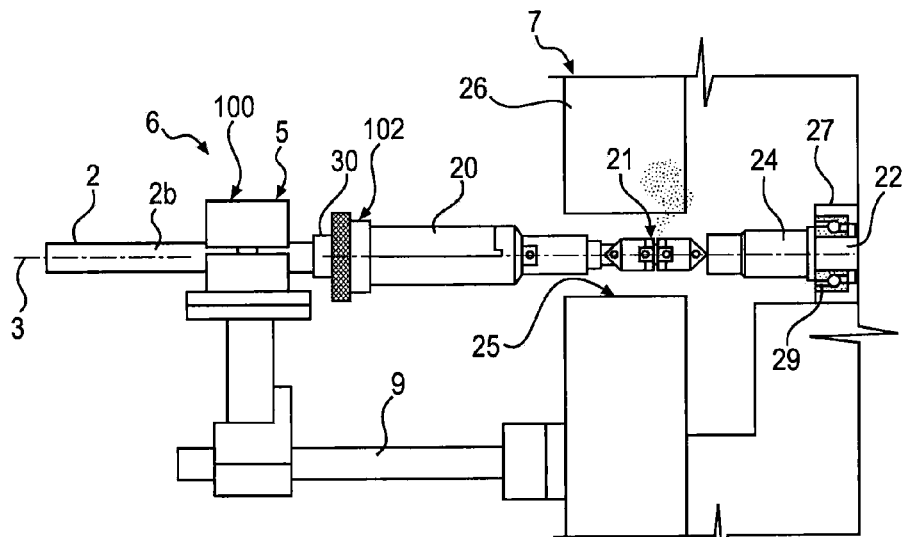
FIG. 3 is an enlarged side view of part of the apparatus of FIG. 1.

Again with reference to FIG. 1 and to the enlarged view of FIG. 3 (representing the detail of FIG. 1 encircled by a dotted line), rotation device 6 comprises a rod handling member 20 suitable for rigid coupling with the extremity of the second end portion 2b of deposition rod 2 at a second axial position 102, and a motor 23 operatively connected to handling member 20 and adapted to generate a rotation motion about the axis of a motor shaft 22.

Handling member is preferably a cylindrical gripping member 20, more preferably of a type including a mandrel. In the following, reference will be made to a gripping member 20, but it is intended that any other type of handling member known in the art suitable to hold a rod along a handling axis can be used in rotation device 6.

Advantageously, the extremity of the second end portion 2b is fitted into an elastic sleeve 30 (FIG. 3) suitable to protect the surface of rod 2. In particular, when gripping member 20 is coupled to the second end portion 2b, sleeve 30 is interposed between the gripping member 20 and second end portion 2b thus avoiding direct contact thereof. This is particularly important in the fifth stage of the OVD process, wherein rod 2 is made of glass and is therefore easily subject to damages. Sleeve 30 can be made for example of Teflon.

Sleeve 30, although protecting the deposition rod 2 from damages, can be the cause of a positioning error of rod 2. In fact, when gripping member 20 couples onto sleeve 30, sleeve 30 may deform in a non-uniform way thus forcing second end portion 2b to lie along an axis slanted with respect to the axis of gripping member 20.

Figure 4:
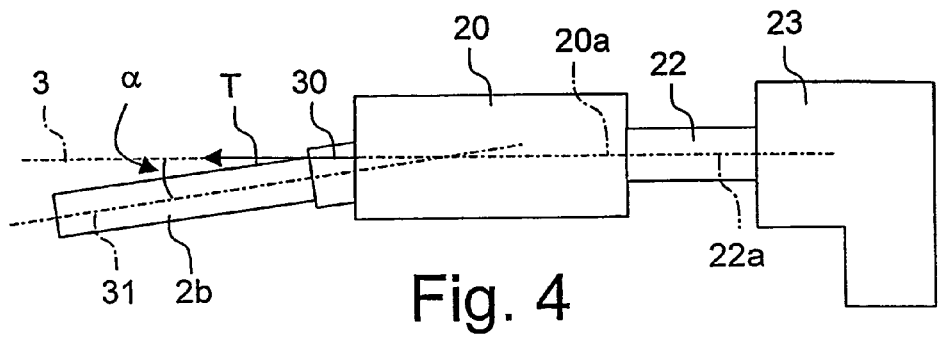
FIGS. 4 and 5 illustrates possible misalignment problems in apparatuses of a known type.

As schematically illustrated in FIG. 4, if the gripping member 20 were rigidly coupled to motor 23 and the axes of gripping member 20 and shaft 22, indicated with 20a and 22a, respectively, were made to coincide with axis 3, the considered positioning error would result in an erroneous orientation of second end portion 2b with respect to deposition axis 3. In other words, the axis of second end portion 2b, here indicated with 31, would define with deposition axis 3 an angle α that is not null, for example an angle of the order of 4 mrad.

Figure 5:
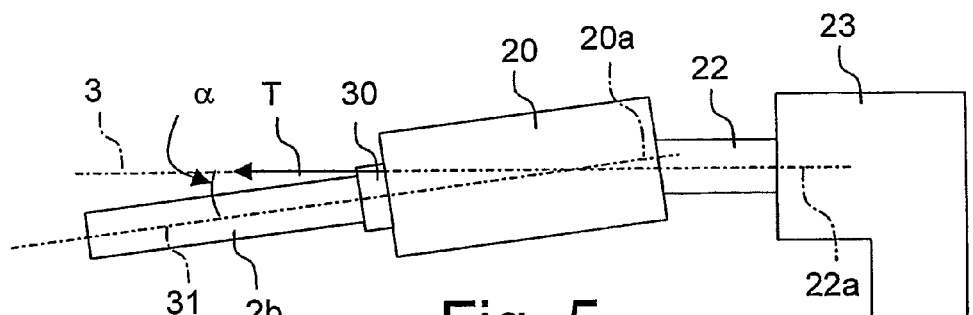

A similar situation would occur, even in the absence of any positioning error (i.e. axis 31 coinciding with axis 20a), if the gripping member 20 were rigidly coupled to motor 23 but misaligned with motor shaft 22 (i.e. axis 20a not coinciding with axis 22a), as shown in FIG. 5. Again, second end portion 2b would not lie along axis 3.

In both the above-described situations, a misalignment would exist between the motor axis 22a and the longitudinal axis 31 of second end portion 2b of the rod member 2, and the rod member 2 would therefore be displaced from the deposition axis 3. As a result, rod 2 would wobble about deposition axis 3 during the deposition process.

To demonstrate the deleterious effect of a Misalignment problem, the Applicant has carried out a numeric simulation wherein a positioning error of rod 2 on the gripping member 20 has been simulated by applying to the second end portion 2b a torque τ that results from a couple of parallel and opposite forces F perpendicular to axis 3 and spaced by an arm A; also, radial constraints are applied to the first and the second end portion 2a, 2b. Torque τ is of a different nature from rotation torque T, since the latter is a torque expressly applied by motor 23 for imparting a rotation motion to rod 2, while the former is an undesired torque caused by a misalignment problem, which is directed perpendicular to axis 3 and tends to bend rod 2 away from axis 3.

The gripping member 20 is supposed to be rigidly coupled to motor 23. The situation of FIG. 4 is thus reproduced, with the addition of a radial constraint (represented by a triangle) on the first end portion 2a that forces rod 2 to lie along axis 3.

Figure 6:
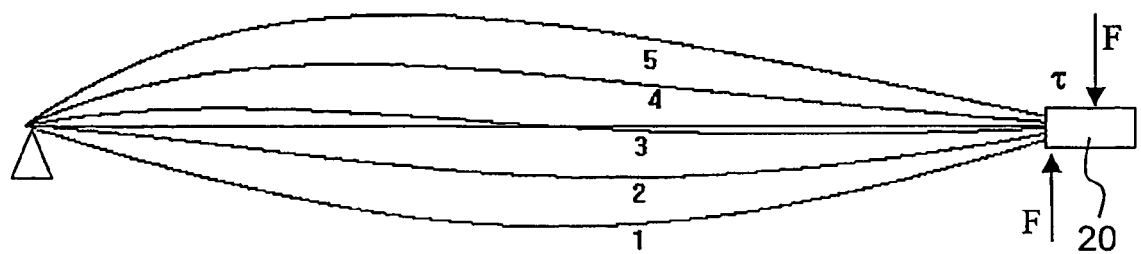
FIG. 6 shows the results of a numeric simulation.

In this simulation, a deposition rod having a length of 1 m, a diameter of 1 cm and the Young modulus of glass has been considered; this rod has been subjected to a torque τ variable from 0 to 440 N·mm. Table I and FIG. 6 show the results of this simulation. In Table I, with "bow" it is indicated the maximum displacement of rod 2 from axis 3 and with "X" the abscissa of this maximum displacement measured from the point of application of the radial constraint to first end portion 2a.

TABLE I

| Curve | Torque [N · mm] | Bow [mm] | X [mm] |
|---|---|---|---|
| 1 | 0 | 0.5 | 575 |
| 2 | 110 | 0.256 | 629 |
| 3 | 220 | 0.085 | 210 |
| 4 | 330 | 0.303 | 346 |
| 5 | 440 | 0.548 | 397 |

Curve 1 corresponds to a situation of null torque τ and the curvature of rod 2 (maximum bow of 0.5 mm) is therefore due to an intrinsic shape defect of the rod. An increase of the torque τ causes a decrease of the curvature of the rod, as shown in Curve 2, and in Curve 3 the torque substantially counterbalances the intrinsic shape defect, thus substantially straightening the rod. Higher torques (Curves 4 and 5) cause bowing of the rod in the opposite direction.

To solve the problems arising from the misalignment situations previously described, rotation device 6 comprises, as shown in FIG. 3, a joint member 21 of a type suitable to transmit torque between two misaligned members, coupled on one side to gripping member 20 and on the other side to the exit shaft 22 of electric motor 23.

In particular, joint member 21 may be of any type suitable to transmit torque between two members that have respective action axes misaligned from each other, where the misalignment can be an angular misalignment (the two axes intersect each other and form an obtuse angle), a parallel misalignment (the two axes are parallel) or a skewed misalignment (a combination of angular and parallel misalignment).

Figure 7:
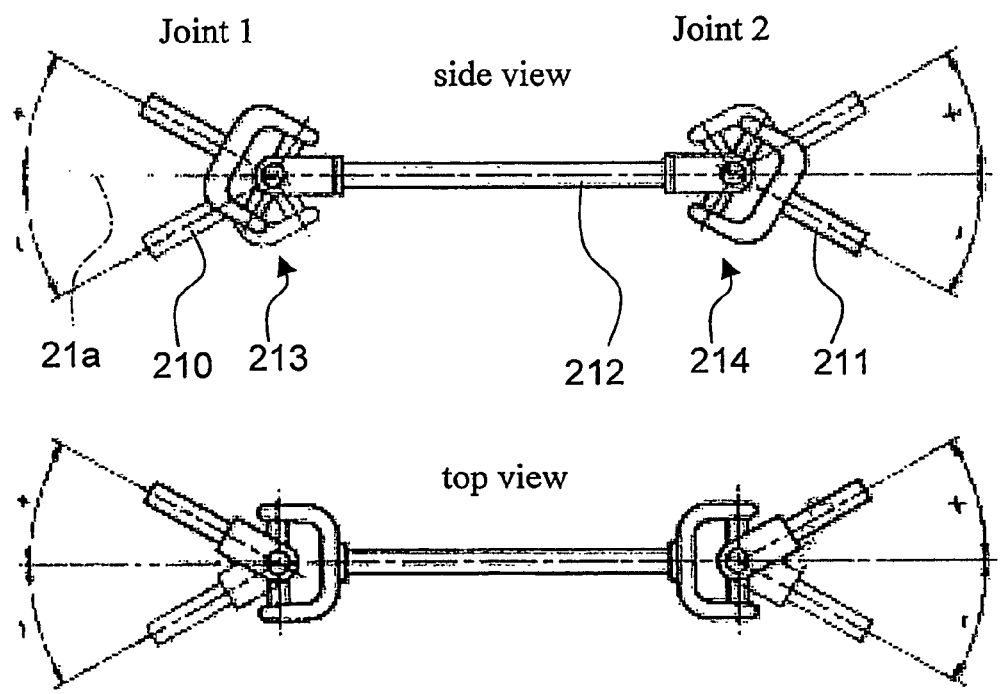
FIG. 7 represents a double universal joint, which can be advantageously used in the apparatus of FIG. 1 for correcting possible misalignment problems.

Joint member 21 is preferably a double joint, more preferably a universal double joint, for example a double Hooke's joint (also known as double Cardan joint). FIG. 7 schematically illustrates (in a side view and a top view) a typical double Hooke's joint, comprising a first and a second connection shaft (or shaft) 210, 211 suitable for rigid coupling with members to be joint, and an intermediate shaft 212, which defines a central axis 21a of the joint member 21 and which is coupled to the connection shafts 210, 211 by means of a first and a second universal joint 213, 214.

Alternatively, joint member 21 may be a flexible joint, for example model HELI-CAL produced by Helical Products Company Ltd., which is particularly adapted for angular misalignments.

As a further alternative, joint member 21 may be a combined joint comprising a universal joint and a flexible joint.

Less preferably, joint member 21 may be a single joint.

Joint member 21 is preferably coupled to shaft 22 through an interconnection member 24 rigidly coupled to shaft 22 and extends horizontally, together with a first portion of gripping member 20, through a passage 25 in a wall 26 of structure 7. A bearing 29 couples shaft 22 to an inner portion 27 of structure 7.

Figure 8:
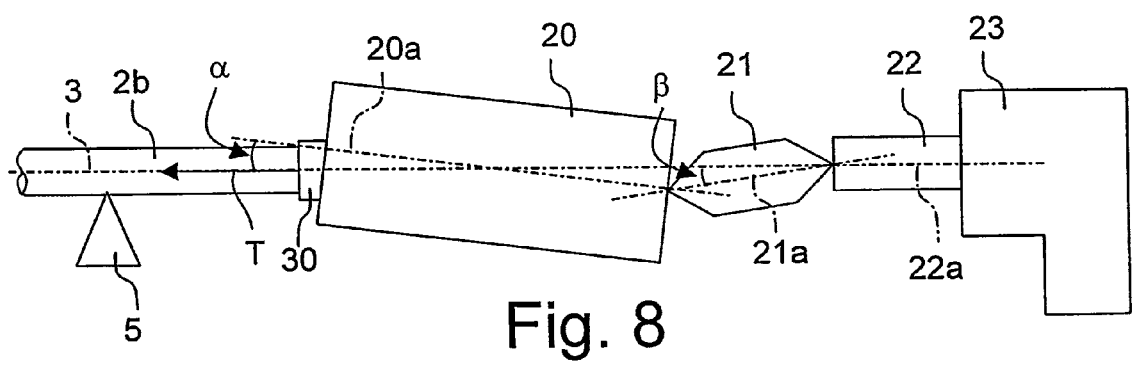
FIGS. 8 and 9 show how the apparatus of the invention overcomes possible misalignment problems; and FIGS. from 10 to 12 shows the results of experimental tests.
Figure 9:
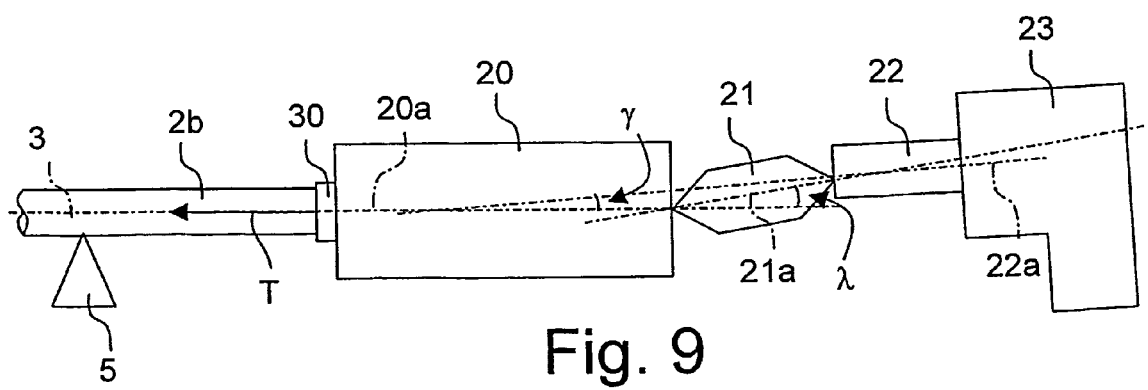

Joint member 21 acts to compensate any misalignment between deposition rod 2, gripping member 20 and motor 23, in the way schematically represented in FIG. 8 and FIG. 9.

FIG. 8 refers to a positioning error, i.e. to a condition of misalignment between the axis of second end portion 2b and the axis 20a of gripping member 20. As it can be observed, while second support member 5 (represented schematically by a triangle) cooperates with first support member 4 (not shown in FIG. 8) to maintain deposition rod 2 coaxial to deposition axis 3, joint member 21 compensates the misalignment problem by allowing the gripping member 20 to lie with its axis 20a inclined with respect to axis 3 of an angle α corresponding to the misalignment angle due to the positioning error, and by redirecting the rotation torque T accordingly. As a result, rod 2, which is already forced to lie along axis 3 by support members 4 and 5, is not subjected to stress (in the form of deforming torques) tending to displace it from axis 3.

In order to allow gripping member 20 to lie at an angle α with respect to axis 3, joint member 21 shall act with its axis 21a inclined at an angle β with respect to axis 3. As a result, during operation of the apparatus 1 both gripping member 20 and joint member 21 rotate both about axis 3 and about their respective axes 20a and 21a.

By redirecting the rotation torque generated by motor 23, joint member 21 prevents deforming action to be applied to rod 2.

FIG. 9 refers to a condition of misalignment (of an angle γ) between the axis of the gripping member 20 and the axis 22a of motor 23. Again, second support member 5 cooperates with first support member 4 to hold deposition rod 2 coaxial with axis 3. In this case, the gripping member 20 lies coaxial with axis 3, too. Joint member 21 redirects the torque from axis 22a to axis 20a through its central axis 21a, thus avoiding the deposition rod 2 to undergo deforming stresses due to the considered misalignment problem. In this case, although central axis 21a of joint member 21 is inclined of an angle δ with respect to axis 3, joint member 21 does not rotate about axis 3 but only about its axis 21a.

The above example permit to appreciate the different function of support members 4, 5 and joint member 21: while the support members 4, 5 act to hold rod 2 coaxial to axis 3, joint member 21 is effective in overcoming any misalignment problem between rod 2 and gripping member 20 or between gripping member 20 and motor shaft 22. Due to the presence of joint member 21, the supporting action of rotation device 6 is weak and the rod 2 is almost completely supported by support members 4, 5.

The process of deposition is performed as follows. The process is initiated by starting electric motor 23 for setting deposition rod 2 into rotation and by starting electric motor 16 for alternating linear movement of burner 9 along direction D.

During this process, as a result of the temperature created by burner 9, the substances emitted react together and the reaction products are deposited on the outer surface of deposition rod 2. The simultaneous rotation of cylindrical member 2 and translation movement of burner 9 brings about substantially uniform deposition of the substances ($SiO_2$ and any dopants) on deposition rod 2, thus forming a substantially homogeneous perform 19.

Moreover, during the deposition process support members 5 and 6 hold deposition rod 2 coaxial to deposition axis 3 and joint member 21 prevents misalignment problems (including rod positioning errors) to cause deforming stress on rod 2.

The process of deposition is therefore performed on a deposition rod 2 whose longitudinal axis substantially coincides with the deposition axis 3. In this way a final preform that is substantially free from shape defects, in particular a final preform having a central portion that is straight and has a constant radial distance with respect to the outer surfaces of the preform, is produced.

When this preform is subjected to a drawing process (after drying and consolidation thereof), an optical fibre having a core that is substantially concentric with the cladding is obtained. Applicant has verified that fibres having a concentricity of less than about 0.3 can be obtained in this way.

To verify the effectiveness of the apparatus of the present invention in avoiding straightness errors of the deposition rod, the Applicant has produced a large number of final preform and has compared these performs with other final preform produced by an apparatus of the type described in WO01/23311 (i.e. an apparatus having two supports for holding the first end portion 2a and a gripping member rigidly coupled to a motor for holding the second end portion 2b). Core rods were produced in both cases according to the process previously described.

Figure 10:
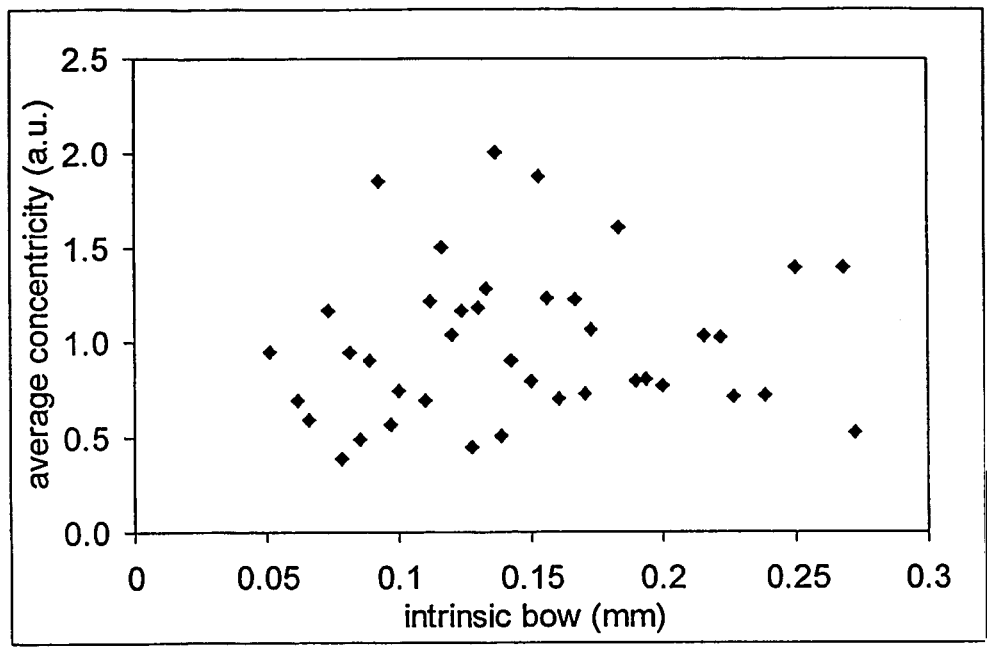
Figure 11:
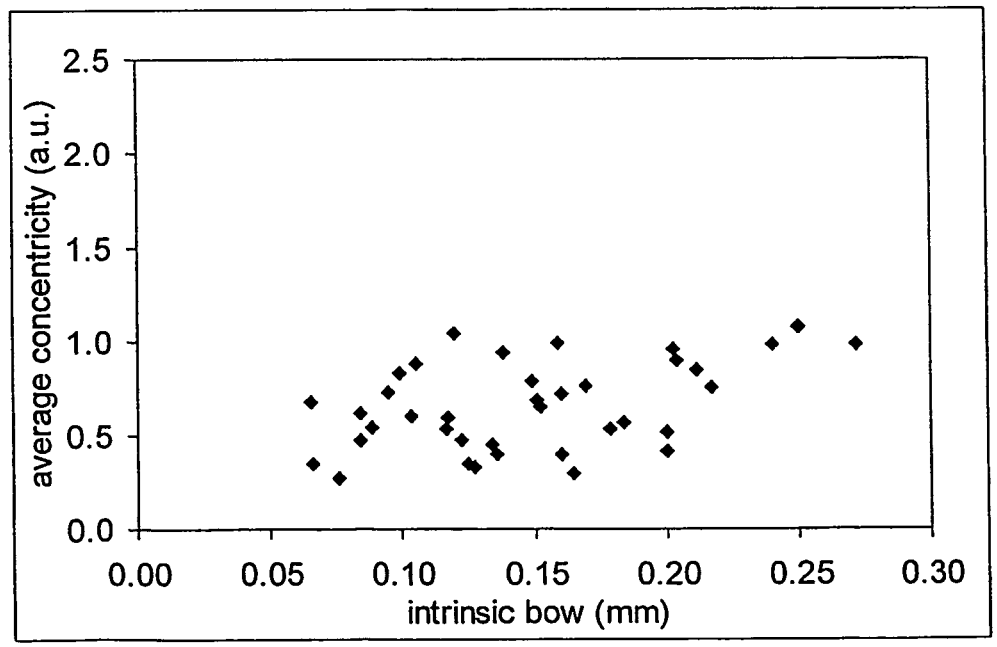

FIG. 10 refers to performs produced by means of an apparatus of the type described in WO01/23311 and FIG. 11 refers to performs produced by means of the apparatus of the present invention. Each point corresponds to a different deposition rod. The abscissa axis represents the values of intrinsic shape defect (intrinsic bow) of the different rods (in mm), measured (off-line) as the maximum distance of the rod from its ideal axis, and the ordinate axis represents the values of the average concentricity of the optical fibres drawn from the performs so obtained (in arbitrary units, normalized with respect to the mean value relative to the points of FIG. 10).

Measurements of concentricity were performed by using the "PK 2400" device produced by the Photonkinetics company. This device can be used to determine the centre of the core and the centre of the optical fibre, and to measure the distance between these centres. In particular, the "PK 2400" device is capable of shining a laser beam into the first end of the optical fibre under test, detecting an image of the second end of the fibre and identifying on that image both the geometrical centre of the optical fibre and the laser point corresponding to the laser beam leaving the said optical fibre. The "PK 2400" device is also capable of measuring the distance between the laser point and the geometrical centre; this measurement represents the concentricity of the optical fibre at the second end of the fibre.

Measurements of rod intrinsic bow were performed using a dedicated device (not shown) comprising a supporting and rotating apparatus capable of setting the rod into rotation about a substantially horizontal axis, and an optoelectronic device capable of measuring the offset between the longitudinal axis of the rod and the axis of rotation while the rod is rotating. This optoelectronic device comprises a laser source capable of generating a light beam directed transversely towards the rod and having a greater diameter than the rod diameter. The measuring device also comprises an optical sensor located opposite the laser source with respect to the axis of rotation and capable of receiving the part of the optical beam which is not intersected by the rod; in this way the optical sensor receives an optical signal which is related to the position of the rod with respect to the axis of rotation and generates a corresponding electrical signal. After having been processed, the electrical signal provides an instantaneous indication of the offset between the longitudinal axis of the rod and the axis of rotation.

To permit measurement of the offset along the entire length of the rod, the laser source and the optical sensor can slide synchronously along the axis of rotation. In this way, the maximum value of the offset can be determined.

From FIG. 10 and FIG. 11 it can be derived that, in the average, preforms produced with the apparatus of WO01/23311 lead to higher concentricity values than those produced by the apparatus of the present invention. This result, according to the Applicant, is due to the higher effectiveness of apparatus of the present invention in reducing the effects of misalignments than an apparatus like the one of WO01/23311.

Figure 12:
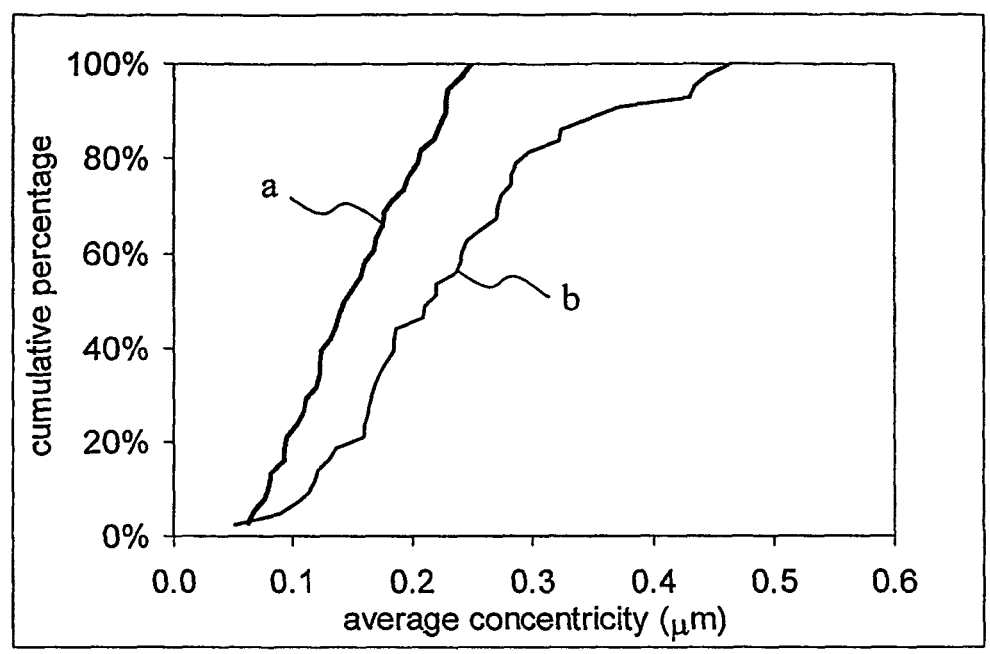

FIG. 12 shows the cumulative percentage of the concentricity values obtained in the two experiments described above. Curves a and b refer to fibres obtained from preforms produced by the apparatus of the present invention and by the apparatus of patent application WO01/23311, respectively. The results of FIG. 12 confirm that the apparatus of the present invention leads to an improvement of the fibre concentricity.

It will be apparent to those skilled in the art that various modifications and variations can be made to the disclosed embodiment of the present invention without departing from the scope or spirit of the invention.

For example, as shown in FIG. 1, an auxiliary support member 4a (represented by dashed lines) can be added close to support member 4. In other words, as FIG. 1 shows, the system may include a support member 4a coupled to first end portion 2a of rod member 2 at a position 104 spaced from support member 4 along deposition axis 3. Alternatively, or in combination, an auxiliary support member 5a (represented by dashed lines) can be added close to support member 5. In this way, it is possible to improve the straightness of the deposition rod 2. In particular, the presence of two support members 4 and 4a providing a double radial constraint to the first end portion 2a and/or two support members 5 and 5a providing a double radial constraint to spaced portions 100 and 106 of the second end portion 2b of deposition rod 2 improves correction of intrinsic shape defects of deposition rod 2. In fact, the combined action of support members 4 and 5 and of an auxiliary support member forces the deposition rod to lie along a straight line.

As previously stated, apparatus 1 may also advantageously be used to carry out the first step of the OVD process, i.e. the deposition process for obtaining the core preform. Although in this case the deposition rod is typically made of a material different from glass, as for example alumina or other ceramic materials, positioning errors and misalignments within rotation device can have the same deleterious effects as those described above, leading in particular to a core preform that is not perfectly cylindrical.

The invention claimed is:

1. A method for chemical deposition on a rod member, comprising:
   supporting the rod member with its longitudinal axis substantially coaxial to a deposition axis, including
      applying a radial constraint to a first end portion of the rod member with a first support member rotatively coupled to the first end portion of the rod member, and
      applying a radial constraint to a second end portion of the rod member with a second support member rotatively coupled to the second end portion at a first axial position on the second end portion of the rod member;
   coupling the second end portion of the rod member to a handling member having a handling axis with the handling member coupled to the rod member at a second axial position on the second end portion of the rod member, the second axial position being spaced axially from the first axial position;
   transmitting a torque generated about a motor axis to the rod member via the handling member, including transmitting the torque from a joint member to the handling member and further transmitting the torque from the handling member to the rod member, for rotating the rod member about the deposition axis; and
   depositing chemical substances on the rod member during rotation of the rod member;
   wherein transmitting the torque comprises redirecting the torque whenever a misalignment occurs between the motor axis and the handling axis or between the handling axis and the longitudinal axis of the rod member, wherein redirecting the torque includes compensating the misalignment with the joint member acting with an axis inclined with respect to the longitudinal axis of the rod member in order to allow the handling axis or the motor axis to lie inclined with respect to the rod axis without deforming the rod member;
   wherein the handling member is a gripper, and the coupling of the second end portion of the rod member to the handling member includes gripping the second end portion of the rod member with the handling member; and
   wherein gripping the second end portion of the rod member with the handling member comprises protecting the rod member by interposing an elastic sleeve between the gripper and rod member.

2. The method of claim 1, wherein supporting the rod member further includes applying a further radial constraint to the first end portion of the rod member at an axial position spaced from the radial constraint applied by the first support member.

3. The method of claim 1, further including applying a further radial constraint to the second end portion of the rod member with an auxiliary support member at a position spaced from the first support member along the deposition axis.

4. The method of claim 1, wherein the joint member comprises a universal joint.

5. The method of claim 1, wherein the joint member comprises a double joint.

6. The method of claim 5, wherein the double joint comprises a universal double joint.

7. The method of claim 6, wherein the universal double joint comprises a double Hooke's joint.

8. The method of claim 1, wherein supporting the rod member with its longitudinal axis substantially coaxial to the deposition axis further includes supporting the first end portion with an auxiliary support member, the first support member and the auxiliary support member being spaced from one another along the first end portion along the deposition axis.

9. The method of claim 1, wherein supporting the rod member with its longitudinal axis substantially coaxial to a deposition axis includes supporting the first end portion of the rod member only with the first support member.

* * * * *